T. POSS.
VEHICLE WHEEL.
APPLICATION FILED APR. 8, 1912.
1,063,892.
Patented June 3, 1913.
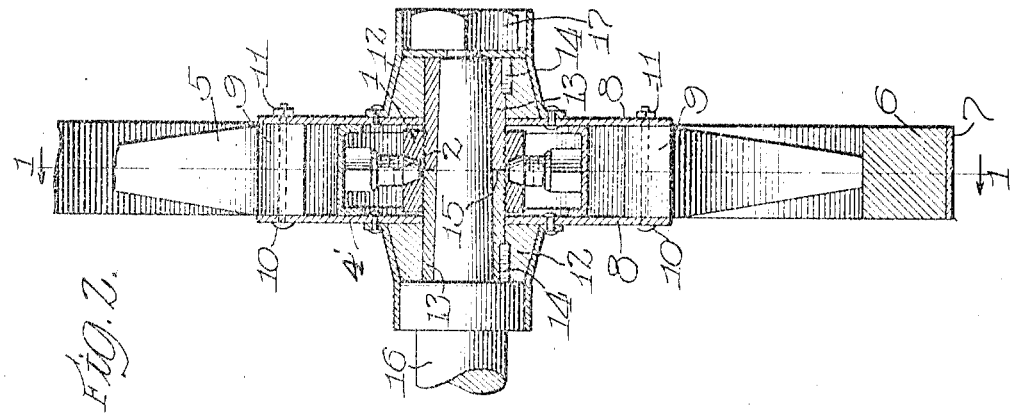
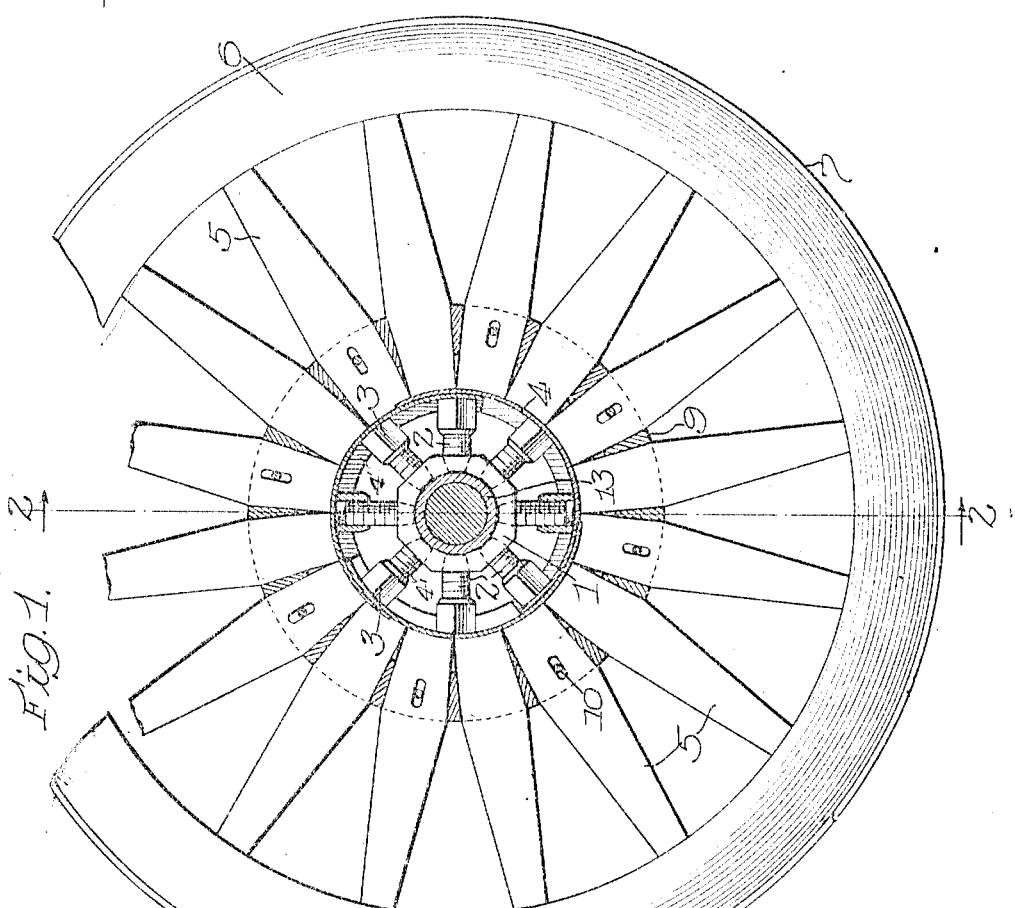

UNITED STATES PATENT OFFICE.

TONY POSS, OF AURORA, ILLINOIS.

VEHICLE-WHEEL.

1,063,892.

Specification of Letters Patent.  Patented June 3, 1913.

Application filed April 8, 1912. Serial No. 689,295.

*To all whom it may concern:*

Be it known that I, TONY POSS, a citizen of the United States of America, and a resident of Aurora, county of Kane, Illinois, have invented certain new and useful Improvements in Vehicle-Wheels, of which the following is a specification.

The main objects of this invention are to provide an improved construction for vehicle wheels; to provide improved means for adjusting the tension of the tire; to provide improved means for truing vehicle wheels; and to provide an improved construction of the hubs of vehicle wheels whereby the means for adjusting the compression of the spokes may be rendered readily accessible without necessitating the entire dismantling of the wheel and without removing the tire from the rim.

An illustrative embodiment of this invention is shown in the accompanying drawing; in which:

Figure 1 is an elevation of a vehicle wheel, some of the parts thereof being removed to more clearly illustrate the interior construction. Fig. 2 is a section taken on the line 2—2 of Fig. 1.

In the construction shown in the drawing the hub of the wheel, comprising a tubular or hollow hub member 1, has a series of threaded arms 2 welded or otherwise rigidly mounted thereon so as to be substantially integral therewith, and extending radially outward therefrom, each of the arms being capped with a threaded nut 3 the whole being surrounded by a split ring or expansion member 4 comprising a plurality of overlapping sections. Each of said overlapping sections being provided at each edge thereof with an inwardly disposed flange or shoulder 4' adapted to provide a channel-shaped seat for the outer ends of the nuts 3. The adjustable ring 4 is resilient and constitutes a stress and shock equalizing bridge which at all times tends greatly to distribute the load over a plurality of arms and nuts. The flanges 4' serve to strengthen and brace the several spans between the arms 2.

The spokes 5 of the wheel radiate outwardly from the ring 4 in the usual manner, their inner ends bearing thereon, and are surrounded by the felly or rim 6 and the tire 7 which are of the usual construction.

A pair of hub flanges or facing plates 8 form a part of the casing of the hub, and are concentrically secured one on each side of the wheel.

An annular series of lugs or wedges 9 are integrally mounted on the inner surface of one of the plates 8 adjacent the periphery thereof, and are adapted to fit in the interstices between the spokes to act as blocking wedges.

The plates 8 are secured to the wheels by means of bolts 10 and nuts 11. A pair of hub sleeves or cap plates 12 each have a section of an axle box 13 secured thereon by means of the keys 14. The sections 13 are adapted to have threaded engagement with the inner surface of the tubular hub member 1 and are intended to be screwed into the hub member 1 from opposite sides and having shoulders 15 which abut when the device is assembled.

The inner surfaces of the cap plates 12 are flanged at their inner edges, and are riveted to the facing plates 8. 16 represents part of an axle protruding from the inner end of the axle box 13, and 17 is the axle nut which secures the hub of the wheel to the axle.

The operation of the device shown is as follows: To adjust the compression of the spokes the wheel is removed from the axle and the bolts and nuts 10 and 11 are removed. The plate 8 other than the one having the lugs or wedges 9 integrally mounted on the inner surface thereof, may then be unscrewed exposing the inner mechanism of the hub as shown in Fig. 1. The adjustment may then be made by turning the nuts 3 until the desired compression is secured. The nuts 3 have prismatic external surfaces to permit the use of a wrench for turning. Old spokes may be removed and new ones substituted therefor by a similar operation, if desired. The overlapping surfaces of the sectional guide ring 4 are preferably lubricated to facilitate ready expansion of the ring when the nuts 3 are tightened.

Although but one specific embodiment of this invention has been herein shown and described, it will be understood that numerous details of the construction shown may be altered or omitted without departing from the spirit of this invention as defined by the following claims.

I claim:

1. In a vehicle wheel the combination of a rim member, radiating compression spokes connected therewith, a tubular hub member, means interposed between said hub member and spokes for adjusting said spokes, an expansion member having overlapping sections interposed between said spokes and means and surrounding said means, a tubular journal box comprising two axially alined parts fitting within said hub member and abutting endwise against each other, and end caps inclosing said journal box and hub member and adapted to secure said journal box and hub member against relative rotation.

2. In a vehicle wheel the combination of a rim member, radiating compression spokes connected therewith, an internally threaded hub member, means interposed between said hub member and spokes for adjusting said spokes, an expansion member having overlapping sections interposed between said spokes and means and surrounding said means, a tubular journal box having threaded engagement with said hub member, and end caps inclosing said journal box and hub member and adapted to secure said journal box and hub member against relative rotation.

3. A vehicle wheel having a tire, rim, spokes, and hub, said hub comprising a tubular hub member, a split ring having a plurality of channel-shaped overlapping sections interposed between said spokes and said hub member and surrounding said hub member, and means bearing between said ring and said hub member and adapted to expand said ring and adjust the compression of said spokes; a pair of hub flanges, a pair of axially alined journal box parts each having threaded engagement with said hub member and adapted to abut within said member, end caps inclosing said journal box parts, and means connecting said end caps for rigidly locking together the various parts of the wheel.

4. In a vehicle wheel, the combination of a tire; rim; spokes; and hub; said hub comprising a tubular hub member, a pair of journal box parts adapted to fit within said hub member, one from each side thereof; an expanding ring comprising a plurality of overlapping sections surrounding said hub member and bearing against the inner ends of said spokes; and means mounted on said hub member and bearing between said hub member and said expanding ring for forcing them apart and compressing said spokes between said rim and said ring.

5. In a vehicle wheel, the combination of a tire; rim; spokes; and hub; said hub comprising an internally threaded tubular hub member; an expanding ring comprising a plurality of overlapping sections surrounding said hub member and bearing against the inner ends of said spokes; means bearing between said hub member and said expanding ring for compressing said spokes between said rim and said ring; a pair of hub flanges; a pair of axially alined journal box parts, each having threaded engagement with said hub member and adapted to abut within said member; end caps inclosing said journal box parts; and means connecting one of each of said end caps, hub flanges, and journal box parts for rigidly locking them together in sets, one of said sets being adapted to be removed from said hub without completely dismantling said hub.

6. In a wheel, in combination, a central hub member, a plurality of arms attached to and radiating from said central member, an expandible ring inclosing said arms and supported thereby, a plurality of spokes abutting endwise at their inner ends upon said ring irrespective of said arms, a rim inclosing said spokes, and means arranged to coact between said arms and ring to expand the latter against said spokes.

Signed at Chicago this 5th day of April 1912.

TONY POSS.

Witnesses:
C. S. COLE,
M. IRENE HUTCHINGS